Patented Jan. 22, 1952

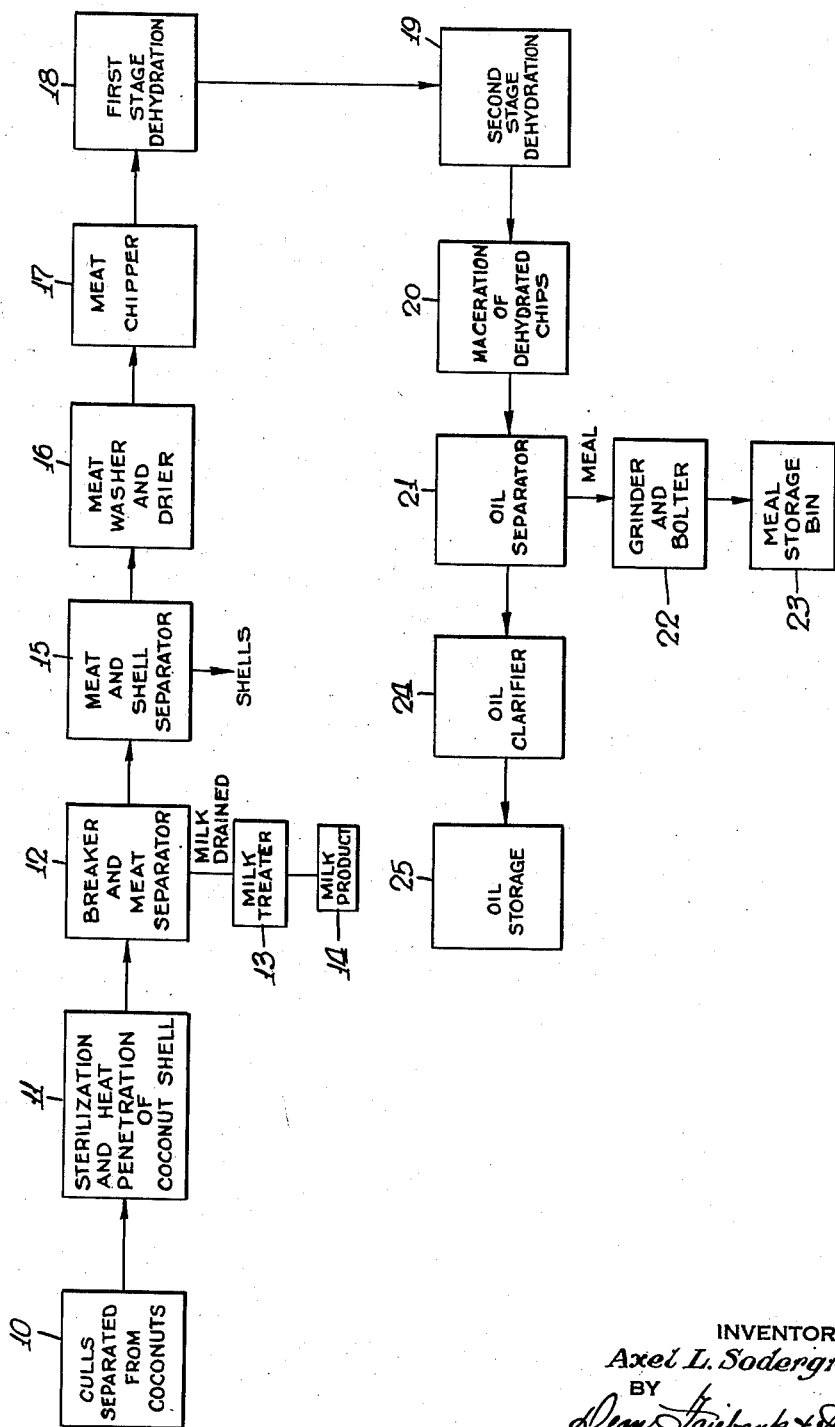

2,583,022

UNITED STATES PATENT OFFICE 2,583,022

PROCESS OF PRODUCING COCONUT OIL

Axel L. Sodergreen, Great Neck, N. Y.

Application October 19, 1945, Serial No. 623,284

1 Claim. (Cl. 260—412.2)

This invention relates to the production of coconut oil and more particularly to a process for producing coconut oil from whole coconuts.

Coconut oil of commerce is produced by extraction from copra which is the dried kernel of "meat" of the coconut. A common native method of producing copra is to husk the nuts, divide them into halves and place the halves in the sun until the meat dries sufficiently to break loose from the shell. The meat is then removed from the shell and allowed to dry for a further period of time in the sun. When substantially dry but having a varying moisture content, the copra is bagged and sold. This method has the obvious disadvantage that it can be operated only when sufficiently sunny weather prevails to bring about drying; hence the method cannot be carried out in the rainy seasons in the tropics. Moreover the method results in the production of a copra having a relatively high moisture content. The presence of water in the copra affects its keeping qualities since moisture and mucilaginous matter form a good medium for the development of organisms leading to decomposition of the oil content of the copra. The oil expressed from such copra has frequently been found of inferior quality in that it readily oxidizes in the presence of oxygen and light and acquires a sharp smell and taste which is termed "rancidity."

A second method heretofore employed is to dry the pieces of coconut meat on a grille disposed over a trench through which products of combustion flow. In this method the meat is frequently badly smoked and poorly dried. In order to obtain reasonably complete removal of moisture by this method, it is frequently necessary to continue the drying until the exterior of the meat is scorched and smoked.

The use of sulfur dioxide gas for drying the meat of the coconut has been suggested. This method involves the disposition of the coconut meat in trays in a gas chamber through which sulfur dioxide is passed for a period of about 12 hours and then placing the thus treated meat in sheds to dry for two weeks or longer. This latter method has the objections that the sulfur dioxide and the equipment in which the sulfur dioxide treatment is carried out are costly and an inordinately long time is required for its practice.

A kiln method of drying coconut meats in which hot air is passed through the kiln, resulting in more rapid drying, has also been suggested. This method has been found to frequently produce copra inferior to the sun dried copra; furthermore such kiln methods heretofore proposed have resulted in relatively large losses of coconut oil.

The copra produced by any of the methods hereinabove described is pressed either by grinding the copra while warm and pressing to remove oil, or by cooking the crushed copra and pressing the cooked material to remove the oil. The pressed cake in either case is ground, heated and pressed again to remove residual oil, the pressure used being of the order of from 4000 to 5000 pounds per square inch. The oil from both pressings is combined, filtered or otherwise treated to separate the meal. The oil thus produced is refined by treatment first with caustic soda then by bleaching with absorbent earths such as activated carbon or fuller's earth. The oil after separation from the clarifying agent is usually filtered, and vacuum distilled, using steam, to remove odoriferous constituents.

It is known that the meat surface of the undried kernel of the coconut is exceedingly susceptible to attack by invisible air-borne spores and bacteria and by copra consuming insects. Decomposition of the coconut meat sets in within a relatively few hours of the splitting of the nut and sometime thereafter the meat tissue becomes slimy, black, sour, evil-smelling, insect ridden and quite unsuitable for commercial utilization, unless special precautions are taken to prevent these conditions from arising. At first principally the vegetable tissue and sugar content of the coconut meat are affected, but later the contained glycerides are split into their components and into degradation components which impart rancidity to the coconut meat and the oil expressed therefrom. The rate of such decomposition appears to depend principally on the moisture content of the coconut meat or of the copra.

From the above it will be evident that it is important in producing copra from which it is desired to express the coconut oil, to carry out the drying of the coconut meat so that not only the surface moisture but the moisture in the interstices in the cellular structure forming the coconut meat is removed. If evaporation of moisture from the coconut meat as in some prior known processes is carried out so that it is exceedingly rapid the surface of the meat becomes very dry while the interior is still impregnated with water owing to the resistance to moisture diffusion within the copra pieces. The condition known as "case hardening" is produced when the surface layer has become so dry that a tough skin develops through which moisture can only diffuse with difficulty. This skin consists of a layer of collapsed cellular tissue sealed with fused sugars.

It is an object of this invention to provide a process for producing from whole coconuts, a coconut oil of improved quality and in high yield.

Another object is to provide such process which results in the production of an edible coconut meal, and, if desired, also coconut milk in a form which can be used as a food product.

Another object of the invention is to provide such process to product copra from which coconut oil may be separated, which oil does not require a chemical refining treatment but can be purified by a simple filtration with or without an absorbent earth treatment to produce an oil of improved quality in that it has little or no tendency to become rancid.

It is a further object of this invention to provide a process for drying coconut meats which results in the production of a substantially dry copra with little or no loss of oil and from which copra a coconut oil of improved quality and in high yield may be obtained. Other objects and advantages of this invention will be apparent from the following detailed description thereof.

In accordance with this invention the coconut meat after separation from the milk is promptly chipped, ground or otherwise subdivided into small uniform particles, and then promptly subjected to dehydration by passage in intimate contact with a hot unsaturated gas preferably air, at a temperature not above 165° F. preferably within the range of 130° to 165° F. so that the moisture is removed by entrainment in the air stream, the dehydration being carried out so that effective and intimate contact between the gas and the small particles of the coconut meat is accomplished, and the time of contact between the coconut meat and the air which is being recirculated thereover being such as to permit the moisture within the interior cells to reach the surface and be removed. By maintaining the temperature conditions and by using a circulating gas stream which is maintained in unsaturated condition relative to its moisture absorbing capacity "case hardening" of the surface and charring thereof is avoided and substantially complete moisture removal is accomplished.

In the preferred embodiment of the invention whole coconuts are first sterilized by steaming to destroy enzymes, air-borne spores, bacteria and other degenerative organisms and to loosen the meat from the inside of the shell. The sterilized and heated nuts are then broken and the milk drained and thus separated from the meat and shells. The meats and shells are then separated, the meat being washed with water to remove any residual milk, and then subjected to a warm air current to remove droplets of water adhering to the surface. The thus treated meat is then subdivided into uniform particles of small size, which are dehydrated at a temperature not over 165° F. by being subjected to a current of hot unsaturated gas in intimate contact therewith as hereinabove described until the moisture content is reduced to below 5% by weight. The dehydrated coconut meat particles are thereafter further ground to produce an oily slurry which is subjected to a pressing operation to separate the oil from the meal. The oil may be clarified by filtration to separate the meal particles and then passed to storage. The meal may be reground for use as an edible product or chemical processing.

Thus there is produced a high yield of oil containing none of the enzymes and oxidized by-products. The oil will therefore stay sweet indefinitely. There is also produced coconut meal which is edible, sweet and valuable as a nutritious element. The meal has been used to make bread which has a delicious aromatic coconut flavor. It has also been used in candy manufacture with gratifying results. The coconut milk may be sterilized and used in sterilized form as a nutritious drink or may be spray dried or vacuum frozen to produce an edible coconut product.

The accompanying drawing is a flow sheet of the steps involved in practicing a preferred embodiment of the invention; it will be understood, however, that not all of the steps shown and hereinbelow described need be employed, for example, the step of washing the meat to remove residual milk may be omitted, or instead of carrying out the dehydration of the subdivided meat particles in two stages this may be carried out in one stage without departing from the scope of the invention. Accordingly the invention is not limited to the flow sheet.

As indicated in the flow sheet the whole coconuts as received are passed to an inspection zone 10 where they are subjected to an inspection treatment to separate the cull nuts from the perfect fruit. This inspection may be carried out either by a light diffusion or ray penetration method which indicates the undesirable nuts and effects their removal from the remainder, or by a flotation gravity method in which the undesirable fruit is separated due to difference in water buoyancy as is well known in the art. The healthy coconuts from the inspection zone 10 are then forwarded by suitable conveyors to a steam chamber 11 where they are subjected to saturated live steam. This treatment sterilizes the exterior of the coconut shell destroying enzymes and killing bacteria and other degenerative organisms. Furthermore the heat penetration tends to loosen the meat from the inside of the shell preparing the coconuts for the next step.

From the sterilizer 11, the sterilized and heated nuts are forwarded by a suitable conveyor to the breaker 12 where the nuts are split and crushed, the milk being allowed to drain into a milk treater 13. This milk treater may be a sterilization apparatus similar to that used for sterilizing milk, i. e., the coconut milk is heated to a temperature of about 140° to 150° F. for a sufficient period of time to destroy bacteria and other organisms. Alternatively the milk may be spray dried or subjected to vacuum freezing to produce a solid, edible milk product. From the milk treater 13, the milk product passes to storage tank 14.

From the breaker 12, the meat and shells are conveyed to a separator 15. The separator may be in a form well known in the art involving the use of a vibrator for effecting separation of the meat from the shells; a gravitational water flotation system, or any other system which effectively separates the meat from the shells may be employed. From the separator 15, shells are passed to a suitable disposal point and the meats are conveyed to a washer and drier 16 where they are subjected first to a water wash to remove residual milk and then to a warm air current to remove droplets of water adhering to the surface of the meat. This washing and air drying treatment is of short duration, being imparted to the coconut meat as it is conveyed through the washer and drier 16 from the separator to a surge or storage bin feeding the meat chipper 17 hereinbelow described.

The meat chipper 17 is of a type commercially available especially designed to handle material such as coconut meats which chipper generates little friction heat in operation. Preferably a chipper is used of a type which shaves the coconut meats rather than grates them and which produces chips of uniform particle size, which particles are relatively small, i. e., of an average length, width an thickness of about one-quarter of an inch.

From the chipper 17 the meat particles pass through the first stage of the dehydration system comprising a first stage dehydrator 18 and a second stage dehydrator 19. In each of these dehydrators a circulating stream of unsaturated hot gas, preferably air or other inert gas such as nitrogen or carbon dioxide, is passed into contact with the meat particles, then subjected to dehumidification, for example, by cooling to condense out the moisture content and thereafter recirculated into contact with the meat particles to remove additional moisture therefrom. The temperature of the circulating gas stream and thus the temperature within the dehydrators should not exceed 165° F. and preferably is maintained within the range of 130° to 165° F. Operating under these conditions charring the "case hardening" of the coconut meat is avoided and substantially all moisture is removed with little or no removal of oil. By maintaining the meat particles in contact with the hot circulating gas stream as hereinabove described the moisture content may be reduced to blow 5% by weight.

In a particularly preferred embodiment of the invention a tray type drier is employed as the first stage dehydrator 18. This drier involves a series of movable perforated trays mounted on a conveyor passing through a chamber through which circulates the hot gas as hereinabove described, meat chips being placed on the trays by suitable automatic feeding devices so that a uniform layer of chips is deposited on each tray. As the trays move through the chamber through which the hot gas is circulated at a temperature not over 165° F., the gas passes in all directions over the chips; first the air may pass longitudinally directed over the top of the chips, then as the trays change position progressing through the drier the gas may be directed from the bottom of the drier through the trays and in another section of the drier the air may be directed from the top of the drier through the trays so that the particles are subjected to dehydration from all sides.

The second stage dehydrator 19 preferably but not necessarily is in the form of a rotating kiln or tunnel type drier unit. The chips are automatically dumped from the first stage dehydrator 18 to the second stage dehydrator 19 where they are subjected to a flow of hot gas at a temperature not over 165° F. passing countercurrent to the flow of the meat chips therethrough, the meat chips being tumbled so that the entire surface area thereof is exposed to the unsaturated hot gas passing thereover.

Operating, as hereinabove described, with a time of contact between the hot unsaturated gas and each particle of meat of about 2½ hours, i. e., this time being required to pass the meat through both driers, 98% of the water content of the meat may be removed.

From the second stage dehydrator 19 the dried chips or copra are discharged into a surge bin or storage tank which feeds the grinder or macerator 20. In the macerator 20 the dried chips or copra are subjected to a grinding or maceration treatment to produce an oily slurry in which the particle size of the meal thus formed is such as to permit its ready separation from the oil in the subsequent separation treatment. This slurry is transferred by suitable pumps and piping to a slurry tank which feeds the oil separator 21. This separator may be in the form of a batch hydraulic press or a continuous flow roller type press well known in the art for effecting separation of the oil from the meal. The meal is conveyed from the separator 21 to a storage bin for subsequent processing, for example, it may be passed to a grinder and bolter 22 which regrinds and bolts the meal preparatory for further use as a food or chemical processing. The meal thus produced has been found to be edible, sweet and valuable as a nutritious element. From the grinder and bolter 22 it is passed to a storage bin 23.

From the oil separator 21 the coconut oil may be passed through an oil clarifier 24 where it is filtered to remove all meal particles and then transferred by pumps and pipe line to the oil storage tank 25. The oil thus produced without further treatment is of high quality; it is sweet smelling and has practically no tendency to develop rancidity even after storage for long periods of time. If desired, the oil may be given a fuller's earth or activated carbon treatment to remove small quantities of impurities such as color forming material which may be present; no caustic soda or other chemical refining treatment is necessary.

In carrying out the process, flow of coconut meat from one step to a succeeding step until after the meat has been completely dried is conducted promptly so as to prevent enzyme action from taking place. As above pointed out such enzyme action causes decomposition of the oil with consequent loss of yield and production of oil of poor quality.

Thus it will be noted the process of this invention involves sterilizing the coconut shells to kill the active enzymes and deteriorating microorganisms on the outside of the shell. This prevents such enzymes from acting on the coconut meat and the oil content thereof. Furthermore in this process as soon as possible after removal of the meats they are subjected to dehydration by contact with a hot unsaturated gas at a temperature not above 165° F., the time of contact being relatively short but adequate to substantially completely remove the moisture. The sterilization of the shell, the rapid drying and the substantially complete elimination of moisture prevents enzymes and degenerative organisms from causing oxidation and rancidification of the oil and the coconut meat from taking place. Moreover, immediately after the drying of the particles, the dry particles are ground to a fine slurry and the oil extracted from the slurry. Hence no opportunity is afforded enzymes and microorganisms from developing and deleteriously affecting the oil and meat. Since the oil contains none of the enzymes, degenerative organisms and decomposition products it will stay sweet indefinitely, and does not require a caustic or other chemical refining treatment as in prior procedures for producing coconut oil. Furthermore a higher oil yield is obtained since in my process the dehydration is carried out with little or no oil loss, and loss of oil due to decomposition such as caused by enzyme action is substantially eliminated. Furthermore, as above noted, the meal obtained is edible, sweet and valuable as a nutritious element.

Since certain changes may be made in carrying out the above process without departing from the scope of the invention, it is intended that all matter contained in the above description shall be interpreted as illustrative and not in a limiting sense.

Having thus described my invention, what I claim as new and desire to secure by Letters Patent of the United States is:

The improvement in the process of producing coconut oil from whole coconuts which comprises, steaming the whole coconuts for a period of time sufficient to sterilize the exterior of the coconut shell and to loosen the bond between the coconut shell and the contained meat, removing the meat from the shell, immediately subdividing the whole meat into chip-like particles having a uniform cross sectional thickness of substantially one-quarter of an inch, contacting the meat particles while maintaining in a quiescent condition with a recirculating flowing stream of dehumidified air maintained at a temperature of between substantially 130° F. and 165° F. for a period of time sufficient to partially dry the particles, then contacting the particles while subjected to a tumbling action with a flowing stream of dehumidified air at an elevated temperature not above 165° F. and for a period of time sufficient to reduce the moisture contained to below 5% by weight; immediately triturating the dry meat particles to form an oil slurry of coconut meal and separating the coconut oil from such slurry.

AXEL L. SODERGREEN.

REFERENCES CITED

The following references are of record in the file of this patent:

UNITED STATES PATENTS

| Number | Name | Date |
|---|---|---|
| 285,220 | Brown | Sept. 18, 1883 |
| 2,065,848 | Anderson | Dec. 29, 1936 |
| 2,338,184 | Kaufman | Jan. 4, 1944 |

FOREIGN PATENTS

| Number | Country | Date |
|---|---|---|
| 4,262 | Great Britain | Aug. 10, 1911 |
| 452,892 | Great Britain | Sept. 1, 1936 |
| 497,547 | Great Britain | Dec. 21, 1938 |

OTHER REFERENCES

Buchanan-Food Industries, October 1928, pages 9-12.